US008752512B1

(12) United States Patent
Francis et al.

(10) Patent No.: US 8,752,512 B1
(45) Date of Patent: Jun. 17, 2014

(54) POWER PLANT USING BRACKISH WATER AS AN ENERGY SOURCE

(76) Inventors: Paul D. Francis, Erie, PA (US); Dejan Mladenovic, Erie, PA (US); Joseph Francis, Gilbert, AZ (US)

( * ) Notice: Subject to any disclaimer, the term of this patent is extended or adjusted under 35 U.S.C. 154(b) by 74 days.

(21) Appl. No.: 12/806,762

(22) Filed: Aug. 19, 2010

Related U.S. Application Data

(60) Provisional application No. 61/280,593, filed on Nov. 6, 2009, provisional application No. 61/281,451, filed on Nov. 18, 2009, provisional application No. 61/283,965, filed on Dec. 11, 2009.

(51) Int. Cl.
*F02B 43/08* (2006.01)

(52) U.S. Cl.
USPC .............................................. 123/3; 123/1 A

(58) Field of Classification Search
CPC ............. F02D 19/0671; F05B 2210/16; F05B 2220/62; F02B 2043/106; F02B 43/10; F02B 43/00; F02B 47/02; F02B 61/045; F02M 25/12; F02M 21/0206
USPC .......................... 123/1 A, 1 R, 2, 3, DIG. 12
See application file for complete search history.

(56) References Cited

U.S. PATENT DOCUMENTS 4,802,826 A * 2/1989 Hall .............................. 417/243
5,899,072 A * 5/1999 Gode .............................. 60/670
6,299,656 B1 * 10/2001 Richardson et al. ............ 44/603
6,311,648 B1 * 11/2001 Larocque .......................... 123/3
7,021,249 B1 * 4/2006 Christison ......................... 123/3
7,036,616 B1 * 5/2006 Kejha ............................ 429/532
7,532,960 B2 * 5/2009 Kumar ............................ 701/19
7,571,683 B2 * 8/2009 Kumar ............................ 105/35
7,759,812 B2 * 7/2010 Taylor et al. .................... 290/44
2003/0066750 A1 * 4/2003 Wu .............................. 204/242
2003/0091503 A1 * 5/2003 Rosenfeld et al. ............ 423/657
2005/0211480 A1 * 9/2005 Kejha ........................... 180/65.2
2006/0042955 A1 * 3/2006 Villalobos ..................... 205/628
2006/0162642 A1 * 7/2006 Morse ........................... 114/382
2008/0092831 A1 * 4/2008 Simon .............................. 123/3
2008/0272605 A1 * 11/2008 Borden et al. .................. 290/55
2009/0314179 A1 * 12/2009 Kumar ............................ 105/35
2010/0300780 A1 * 12/2010 Caruso et al. .............. 180/65.21
2011/0061376 A1 * 3/2011 McAlister ....................... 60/498

* cited by examiner

*Primary Examiner* — Noah Kamen
*Assistant Examiner* — Long T Tran
(74) *Attorney, Agent, or Firm* — Richard K Thomson

(57) ABSTRACT

An electrolyzer converts brackish water to hydrogen and oxygen which are utilized in the multiple cylinder IC engine to reduce the amount of diesel utilized in the power plant. This improves emissions and reduces energy cost of operating the engine. Storage tanks for the oxygen and hydrogen are embedded in the diesel fuel tank to provide dual-walled protection for enhanced security and safety in transporting and storing the hydrogen. Possible energy sources for powering the electrolyzer include third rail technology, multiple unit (MU) jumper cables attached to power sources in refueling stations, a solar collector array, and traction motors associated with a dynamic brake system for the vehicle.

4 Claims, 6 Drawing Sheets

13 PLC CONTROLLER
SIGNAL
68A METERING PUMP
SIGNAL
36 STARTER
34 MULTIPLE CYLINDER CUMBUSTION ENGINE
68B METERING PUMP
42 BATTERY
40
38 TEMP SENSOR
15 ECU

POWER PLANT USING BRACKISH WATER AS AN ENERGY SOURCE

This application claims the benefit of provisional patent applications 61/280,593; 61/281,451; and 61/283,965 filed Nov. 6, 2009, Nov. 18, 2009, and Dec. 11, 2009, respectively.

BACKGROUND AND SUMMARY OF THE INVENTION

The present invention is directed to the field of combustion engines. More particularly, the present invention is directed to a power plant which reduces the amount of diesel needed to operate the engine, which has the added benefits of reducing cost of operation and atmospheric emissions.

With the fluctuation of the prices of petroleum-based fuels such as diesel, and the constantly reduced availability of such resources effectively guaranteeing upward pressure on the costs for such fuels, there is significant interest in finding alternative fuel for vehicles including locomotives and over-the-road vehicles such as semis and buses. Further, the power plant described here can offer advantages for use in fresh water/ocean-going vessels and off-shore platforms, and for standalone diesel-burning generator for providing emergency electricity, as well. The standalone generation capability is useful for emergency power at airports and the like for both in terminal requirements and for energizing ground support vehicles. Additional applications include power requirements of farmland irrigation equipment. In addition, there is significant difficulty in maintaining a "clean-running" diesel engine so there is often a significant pollutant cloud trailing a bus, semi or train. This problem is exacerbated by the fact that government has mandated reduced emissions by recent Federal legislation, particularly relating to the rail industry.

The power plant of the present invention utilizes an electrolyzer to separate brackish water into its component elements: hydrogen, oxygen, and salt, with the hydrogen and oxygen being utilized as combustible products and the salt recycled to the storage tank for the brackish water to inhibit freezing during the winter months. Safety is provided for onboard storage of the separated hydrogen and oxygen by nesting a hydrogen-oxygen storage tank within the walls of the diesel fuel tank. The oxygen is particularly useful when, for example, the second, third and fourth engines in a multiple engine locomotive become oxygen "starved" by the lead engine in a tunnel, for example. The power plant of the present invention has been named Ocean Application of Salt Water as a Implementation System (OASWIS) for Rails and OASWIS for Over the Highway Vehicles.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1A:
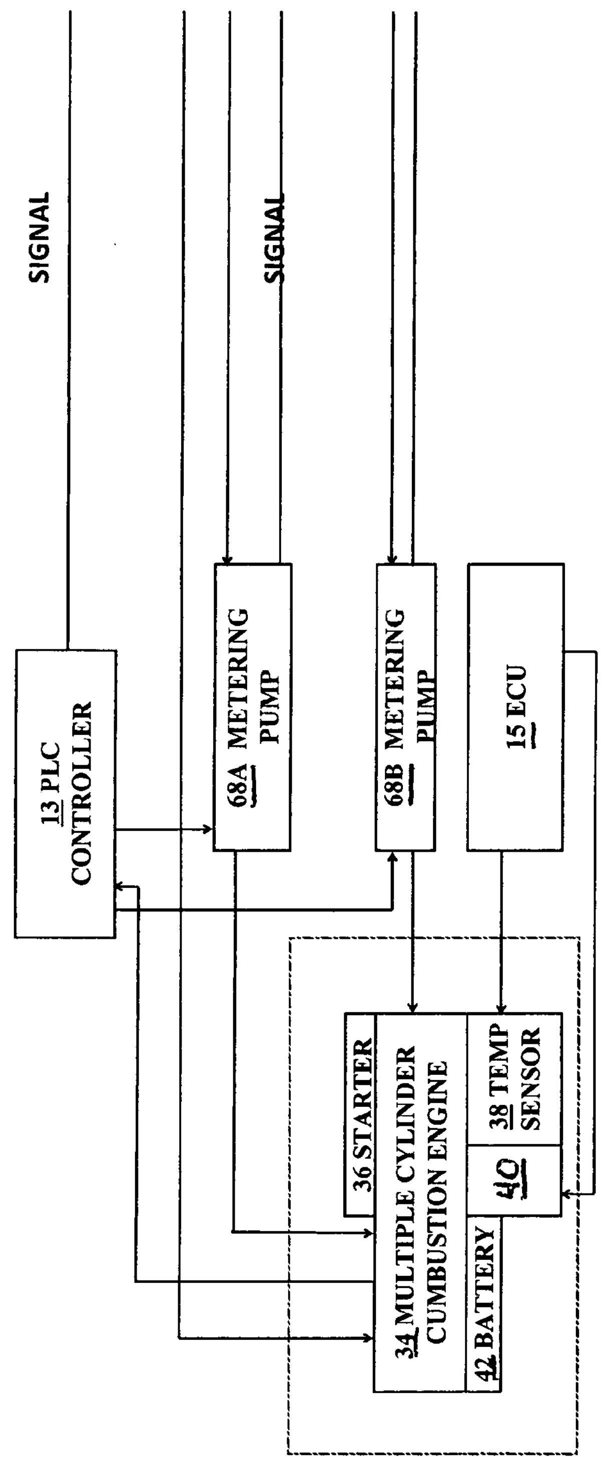
FIG. 1A is a schematic diagram depicting the upper, left portion of the electrical and mechanical connections for the electrolyzer of the present invention.
Figure 1:
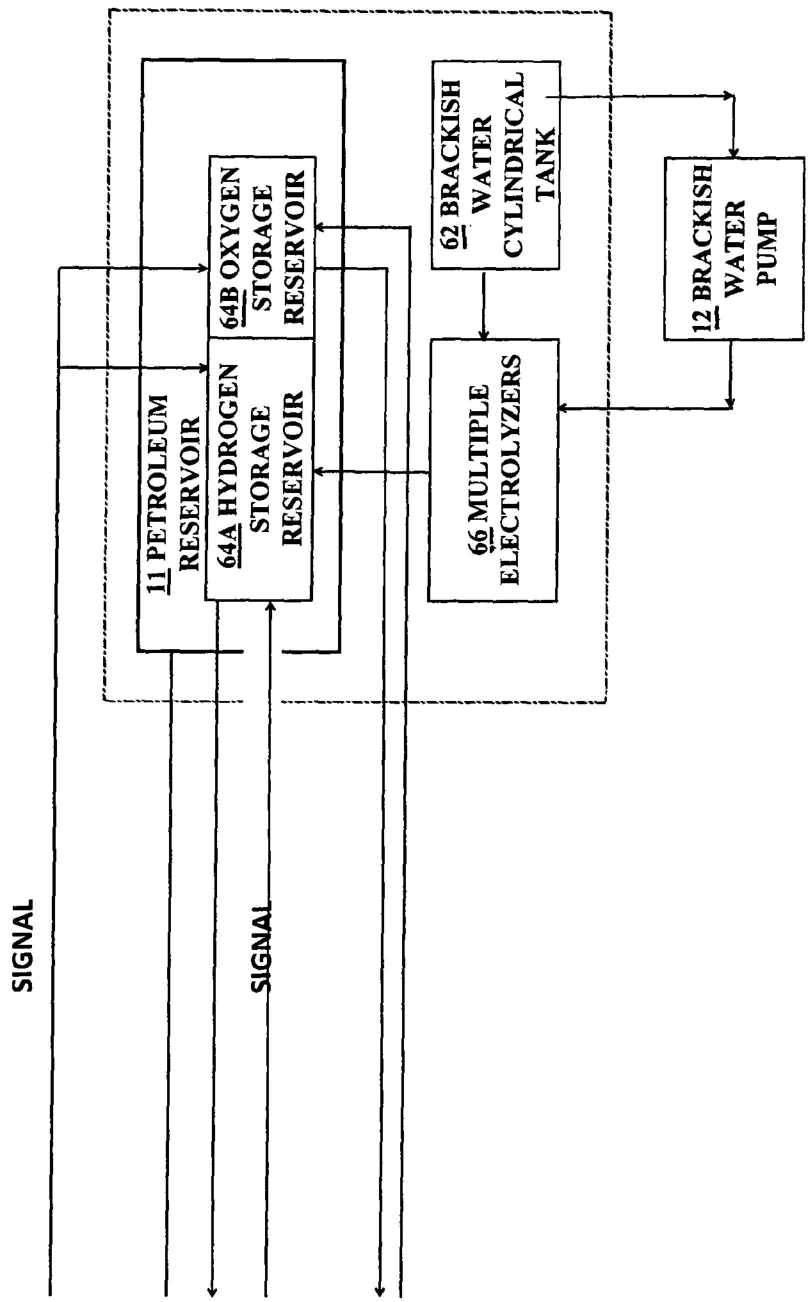
FIG. 1B is a schematic diagram depicting the upper, right portion of the electrical and mechanical connections for the electrolyzer of the present invention.
FIG. 1C is a schematic diagram depicting the lower, left portion of the electrical and mechanical connections for the electrolyzer of the present invention.
Figure 1:
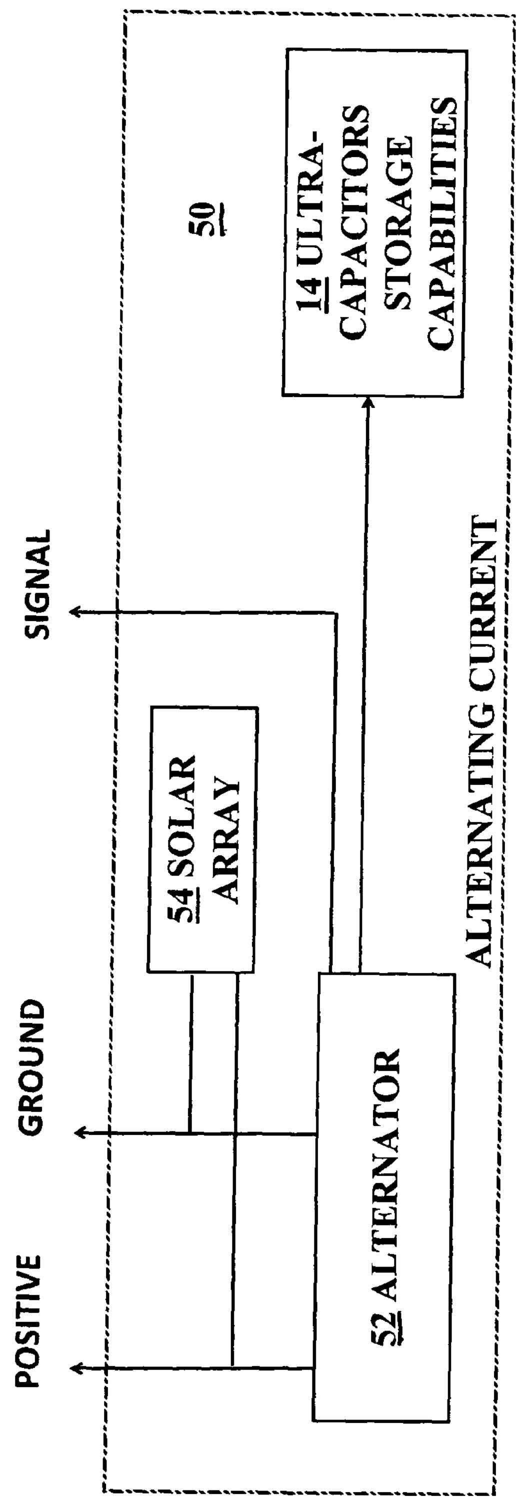
Figure 2:
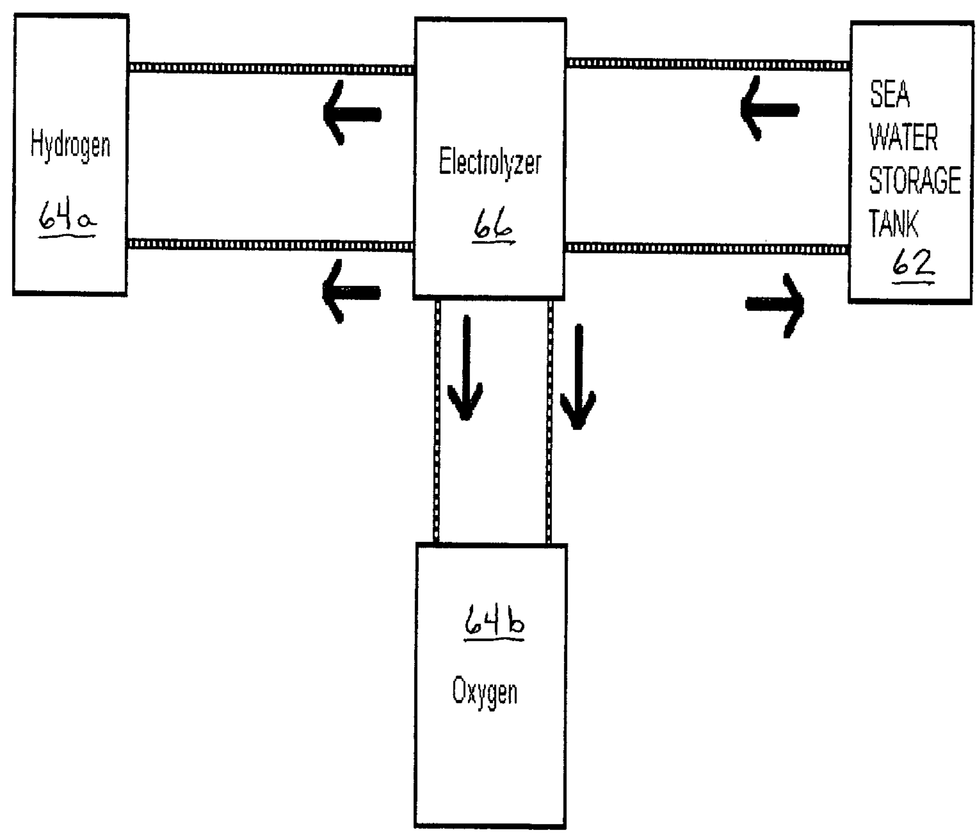
FIG. 2 is schematic diagram depicting one form of the mechanical connections of the first embodiment.

A first embodiment of the power plant of the present invention is depicted in FIG. 1 generally at 20. Power plant 20 includes the diesel combustion engine array 30; the electrical supply system 50 and the auxiliary fuel supply 60.

Diesel combustion engine array 30 includes a multiple cylinder IC engine 34, starter 36, temperature sensor 38, mass air flow sensor (MAF) 40 and supply battery 42. The electrical supply system 50 includes an alternator 52 and an energy source 54 that is an electrical supply means selected from a group consisting of third rail technology, multiple unit (MU) jumper cables attachable to power sources in refueling stations, a solar collector array, and traction motors associated with a dynamic brake system for the vehicle. The primary function of the electrical supply means 54 is to energize the plurality of electrolyzers 66 of the auxiliary fuel supply 60. The electrical supply means will most preferably interface with electrolyzers 66 through integral ultra-capacitors 14 (one ultra-capacitor for each electrolyzer) which will enable periodic random energization of the electrolyzer without necessitating increased power from the electrical supply means 54 on the locomotive/tractor trailer. Third rail technology is well known in the industry for supplying power to electric trains. Its implementation here as an energy source for the electrolyzer would be a simple adaptation of existing technology. Alternatively, the MU jumper cables utilized to interconnect the electrical systems of multiple unit locomotives could be used to power the electrolyzer while the locomotive is in station for refueling and/or cargo loading/unloading. Refueling may involve taking on additional diesel but is principally envisioned as filling storage tank 62 with brackish water. A third possible energy source 54 for the electrolyzer 66 would be a solar array which could adorn the roof of one or more of the diesel engines or associated rail cars. Yet a fourth option, the traction motors utilized in the braking system can function as regenerative brakes such that the energy gained by slowing the locomotive is converted to electricity. What ever the source, electrical supply means 54 produces energy which can be utilized by the electrolyzers 66 to convert the brackish water to hydrogen and oxygen. There is a distinct advantage to the customer to use power otherwise used for Dynamic Braking. This electrical current "Power" is otherwise presently discharged to the atmosphere as lost heat via Dynamic Braking Grid(s). Capturing and reusing this lost power is highly cost effective.

Figure 4:
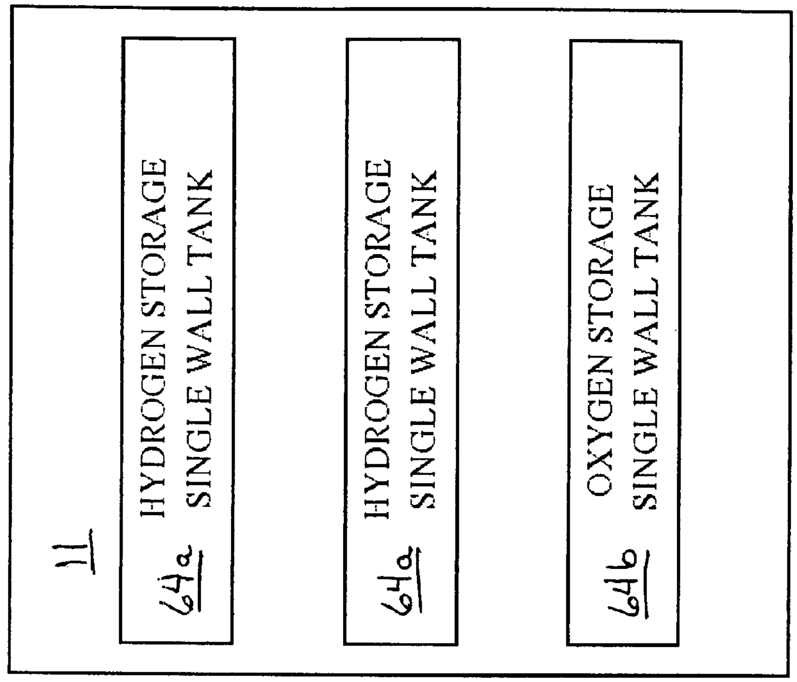

The auxiliary fuel supply 60 includes storage tank 62 for the brackish water, hydrogen reservoir tank 64*a* and oxygen reservoir tank 64*b* for receiving the byproducts from the electrolyzer. It is envisioned that the reservoir tanks 64*a*, 64*b* will be installed inside the existing diesel tank for both rail and over-the-road applications as less diesel storage will be necessary (FIG. 4). Further, this dual wall enclosure for the hydrogen and oxygen provides an additional level of safety for their transport and storage. It is preferred that dual hydrogen storage tanks 64*a* be provided within the confines of diesel storage tank 11. The salt which results from the electrolyzing process will typically remain in a slurry that is returned to storage tank 62. Saline levels in tank 62 can vary between 2 ppm and 450,000 ppm. Salt water is readily available from seaboard locations along the Atlantic, Gulf and Pacific and from the bilges of ocean-going vessels in the great lakes. Rock salt can be added to fresh water to maintain freeze resistance in the winter months, while fresh water can be utilized when freezing is not an issue during the summer months. An alternative to the use of rock salt/fresh water combination is the trucking of brackish water from the coasts using rail tank cars or over-the-road tank trucks, as needed. Metering pumps 68*a* and 68*b* are provided with associated supply feed tubes to transfer hydrogen and oxygen, respectively, to IC engine 34. Dual-fuel fuel-injectors will be utilized in IC engine 34 to introduce the hydrogen into the cylinders.

Programmable logic circuit (PLC) 13 is utilized to turn brackish water pump 12 and metering pumps 68*a* and 68*b* on and off as needed. PLC 13 also receives data input from pressure sensors in storage tanks 64*a* and 64*b* for the hydrogen and oxygen, respectively, to assist in its monitoring function. Further, PLC 13 receives input from electrical supply system 50 telling it when alternator 52 is recharging storage battery 42 and ultra-capacitor storage 14. Finally, PLC 13 monitors the operation of IC engine 34 and will safely shut down the engine if an anomaly occurs. Engine control unit (ECU) 15 which controls IC engine 34 in accordance with predetermined operating parameters, is adjusted at the factory to accept additional input from PLC 13.

Figure 3:
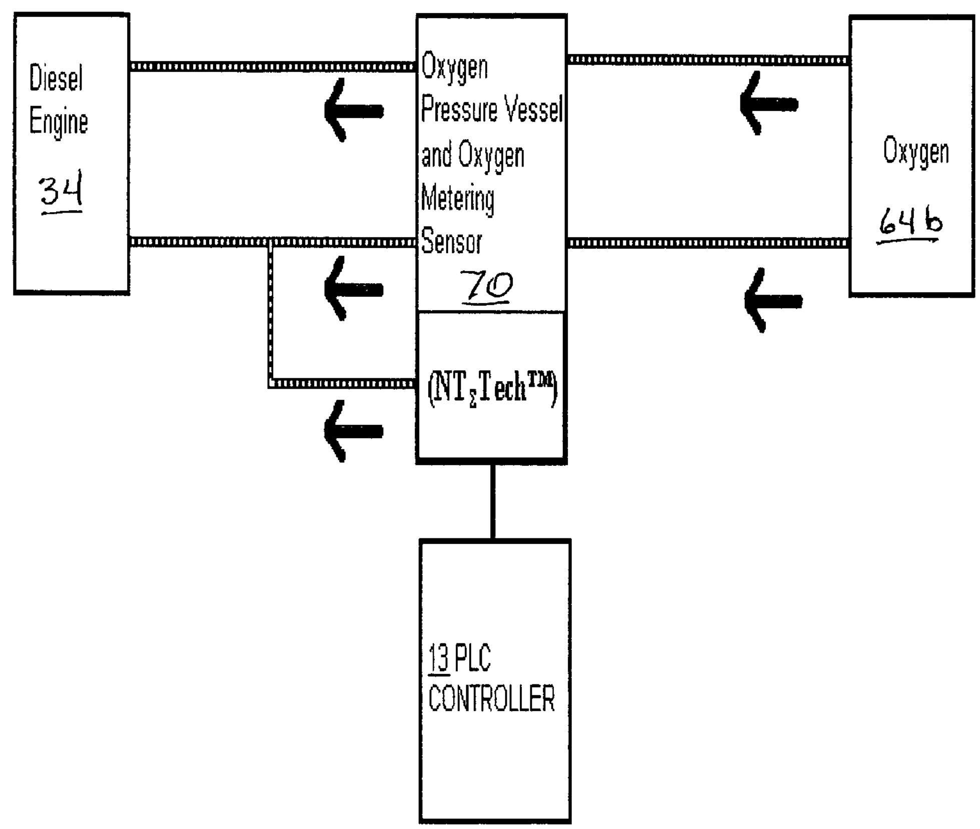
FIG. 3 is a schematic diagram depicting an arrangement for coping with oxygen starvation; and, FIG. 4 is a schematic diagram depicting a secure storage area for the oxygen and hydrogen.

It is known that when a locomotive enters a lengthy tunnel (e.g., one mile or longer), the temperature in the tunnel is increased rarefying the oxygen available to the engines. In a multiple unit locomotive, the lead engine can cause the succeeding engines to become "oxygen starved". FIG. 3 depicts a schematic arrangement in which sensor 70 detects oxygen deprivation and causes oxygen to be fed from reservoir tank 64*b* to the cylinders of IC engine 34 to ensure proper levels of oxygen for more complete combustion of the diesel/hydrogen fuel mixture being burned therein. $NT_{\Sigma}$Tech™ is the copyrighted software which monitors the engine's need for oxygen and controls the mixture of oxygen with air to avoid an oxygen-rich fuel mixture which could pose an explosive threat.

By utilizing the power plant 20 of the present invention, overall utilization of diesel is reduced. This has the additional benefit of reducing production of nitrous oxide levels to 0.67 gm/kw-hr peak and average levels of 0/13 gm/kw-hr. It is envisioned that the IC engine 34 will preferably be turbo charged using a large amount of lean fuel mixture to increase available horsepower.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. Apparatus for improving an efficiency of a locomotive by reducing an amount of diesel burned, increasing completeness of combustion and utilizing waste energy, said apparatus comprising:

a) a diesel-burning combustion engine for burning hybrid fuel, said hybrid fuel including diesel and hydrogen;
b) first tank means for storing brackish water;
c) electrolyzer means for separating brackish water received from said first tank means into its component elements—hydrogen, oxygen and salt;
d) an energy source used with said electrolyzer means providing electrical energy on an as-needed basis to facilitate this separation of brackish water into its component elements, said energy source including:
 i) a dynamic braking system featuring traction motors utilized to slow the locomotive;
 ii) an ultra-capacitor interfaced between said electrolyzer means and said dynamic braking system to store waste energy generated by said traction motors during braking, said ultra-capacitor supplying electricity to said electrolyzer on an as-needed basis to facilitate said separation;
e) second tank means for storing hydrogen received from said electrolyzer means;
f) third tank means for storing oxygen received from said electrolyzer means;
g) first supply feed tube means connected between said third tank means and said combustion engine;
h) second supply feed tube means connected between said third tank means and said combustion engine;
i) sensor means to detect an oxygen-deprived condition in said combustion engine when entering a tunnel and a programmable logic circuit for causing oxygen to be fed from said third tank means through said second supply tube means to said combustion engine to enhance burning of said hybrid fuel;

whereby waste energy powers said electrolyzer which provides fuel for consumption in said combustion engine and oxygen on-demand to enhance burning efficiency thereby reducing the amount of diesel burned and the amount of emissions from said diesel-burning engine.

2. The apparatus of claim 1 wherein said second tank means comprises two single wall tanks for storing hydrogen produced by said electrolyzer, said two tanks being situated inside a diesel storage tank to provide additional safety.

3. The apparatus of claim 1 wherein said third tank means comprises a single wall tank for storing oxygen produced by said electrolyzer.

4. Apparatus for improving an efficiency of a locomotive by reducing an amount of diesel burned and increasing completeness of combustion, said apparatus comprising:

a) a diesel-burning combustion engine for burning hybrid fuel, said hybrid fuel including diesel and hydrogen;
b) first tank means for storing brackish water;
c) electrolyzer means for separating brackish water received from said first tank means into its component elements—hydrogen, oxygen and salt;
d) an energy source used with said electrolyzer means providing electrical energy on an as-needed basis to facilitate this separation of brackish water into its component elements, said energy source including:
 i) a third rail system for receiving electrical power;
 ii) an ultra-capacitor interfaced between said electrolyzer means and said third rail system to store electrical energy from said third rail system, said ultra-capacitor supplying electricity to said electrolyzer on an as-needed basis to facilitate said separation;
e) second tank means for storing hydrogen received from said electrolyzer means;
f) third tank means for storing oxygen received from said electrolyzer means;
g) first supply feed tube means connected between said third tank means and said combustion engine;

h) second supply feed tube means connected between said third tank means and said combustion engine;

i) sensor means to detect an oxygen-deprived condition in said combustion engine and a programmable logic circuit for causing oxygen to be fed from said third tank means through said second supply tube means to said combustion engine to enhance burning of said hybrid fuel;

whereby said third rail system powers said electrolyzer which provides fuel for consumption in said combustion engine and oxygen on-demand to enhance burning efficiency thereby reducing the amount of diesel burned and the amount of emissions from said diesel-burning engine.

* * * * *